(12) United States Patent

Hu et al.

(10) Patent No.: US 12,665,997 B1

(45) Date of Patent: Jun. 23, 2026

(54) AUTOSTEREOSCOPIC DISPLAY APPARATUS AND A METHOD FOR REDUCING CROSSTALK

(71) Applicant: JoyVision Technology.,CO LTD, Taoyuan City (TW)

(72) Inventors: Cheng-Chung Hu, Taoyuan City (TW); Han-Hsun Kuo, Taoyuan City (TW)

(73) Assignee: JOYVISION TECHNOLOGY., CO LTD, Taoyuan City (TW)

( * ) Notice: Subject to any disclaimer, the term of this patent is extended or adjusted under 35 U.S.C. 154(b) by 0 days.

(21) Appl. No.: 19/422,747

(22) Filed: Dec. 17, 2025

(30) Foreign Application Priority Data

May 23, 2025 (TW) ................................. 114119513

(51) Int. Cl.
*H04N 13/305* (2018.01)
*H04N 13/125* (2018.01)
*H04N 13/324* (2018.01)
*H04N 13/398* (2018.01)

(52) U.S. Cl.
CPC ......... *H04N 13/305* (2018.05); *H04N 13/125* (2018.05); *H04N 13/324* (2018.05); *H04N 13/398* (2018.05)

(58) Field of Classification Search
None
See application file for complete search history.

(56) References Cited

U.S. PATENT DOCUMENTS

| | | | | |
|---|---|---|---|---|
| 6,456,340 | B1 * | 9/2002 | Margulis | H04N 9/3194 348/746 |
| 8,212,810 | B2 * | 7/2012 | Naske | H04N 13/305 348/42 |
| 9,532,038 | B2 * | 12/2016 | Berretty | H04N 13/351 |
| 10,819,975 | B2 * | 10/2020 | Allio | H04N 13/324 |
| 2002/0063807 | A1 * | 5/2002 | Margulis | G06T 1/20 348/745 |
| 2007/0035706 | A1 * | 2/2007 | Margulis | H04N 9/3102 353/122 |
| 2007/0035707 | A1 * | 2/2007 | Margulis | H04N 9/312 353/122 |
| 2008/0117233 | A1 * | 5/2008 | Mather | H04N 13/312 348/E13.043 |
| 2014/0028809 | A1 * | 1/2014 | Bruls | H04N 13/349 348/51 |
| 2014/0184730 | A1 * | 7/2014 | Liu | H04N 13/351 348/14.08 |
| 2014/0267388 | A1 * | 9/2014 | Smyth | B60K 35/29 345/173 |
| 2015/0130916 | A1 * | 5/2015 | Hamagishi | H04N 13/317 348/59 |
| 2017/0208319 | A1 * | 7/2017 | Kim | H04N 13/305 |
| 2019/0058874 | A1 * | 2/2019 | Kim | H04N 13/398 |

(Continued)

*Primary Examiner* — Mohammad J Rahman

(74) *Attorney, Agent, or Firm* — McClure, Qualey & Rodack, LLP

(57) ABSTRACT

An autostereoscopic display apparatus and a method for reducing crosstalk are disclosed. The apparatus includes an array of display pixels arranged in rows and columns, and an array of elongated optical elements extending parallel to one another and overlying the display pixels. For any given pixel, an optimized display value is determined according to a compensation equation based on the pixel's original value, a corresponding pixel value for the other viewpoint, and adjustable coefficients.

7 Claims, 6 Drawing Sheets

(56)                    References Cited

U.S. PATENT DOCUMENTS

| | | | | |
|---|---|---|---|---|
| 2019/0121148 | A1* | 4/2019 | Wang | G02B 30/29 |
| 2019/0124324 | A1* | 4/2019 | Allio | H04N 13/398 |
| 2019/0166359 | A1* | 5/2019 | Lapstun | H04N 13/307 |
| 2019/0369407 | A1* | 12/2019 | Kim | G02B 30/27 |
| 2023/0045982 | A1* | 2/2023 | Lapstun | G02B 27/0093 |
| 2023/0217000 | A1* | 7/2023 | Geisler | G06T 5/50 |

* cited by examiner

10

Ideal Right

Ideal Left

10

Actual Right

20

AUTOSTEREOSCOPIC DISPLAY APPARATUS AND A METHOD FOR REDUCING CROSSTALK

CROSS-REFERENCE TO RELATED APPLICATIONS

This non-provisional application claims priority under 35 U.S.C. § 119(a) to Taiwan Patent Application No. 114119513, filed on May 23, 2025, the entire contents of which are hereby incorporated by reference herein.

PRIOR ART

When producing glasses-free three-dimensional (3D) images using a lenticular lens, the objective is to precisely direct light into separate color channels so that each eye receives its own independent image. However, when the contrast between images is very high, crosstalk may occur—that is, the image intended for one eye may leak into the other.

As shown in FIG. 1A, assuming that the ideal image for the right-eye viewing angle is a pure red square 10 viewed from a certain direction, in practice—as illustrated in FIG. 1B, which shows the actual crosstalk effect perceived by the right eye—the right eye perceives color leakage from the image corresponding to the left-eye angle, resulting in severe double-image crosstalk at the high-contrast boundaries of a non-pure red square 20. Since the left and right eyes are separated horizontally (i.e., they exhibit horizontal parallax), crosstalk occurs primarily at horizontally oriented high-contrast regions.

As shown in FIGS. 2A and 2B, when producing glasses-free three-dimensional (3D) images using a lenticular lens, an autostereoscopic display apparatus may comprise a display pixel array 3 including a plurality of display pixels 5 arranged in rows and columns, and an array of elongated optical elements 4 extending parallel to one another and overlying the display pixels 5. For any given pixel 5, there is a corresponding pixel associated with the other viewpoint. When the contrast between associated pixels is very high, at least one eye may perceive color leakage from the image corresponding to the opposite viewing angle, thereby causing double-image crosstalk at high-contrast boundaries.

BACKGROUND OF THE INVENTION

The present invention relates to autostereoscopic display technology, and more particularly to a display apparatus and method for reducing crosstalk that occurs in glasses-free three-dimensional (3D) displays.

SUMMARY OF THE INVENTION

The present invention addresses the issue of viewpoint crosstalk that occurs in existing glasses-free three-dimensional (3D) display devices, particularly at high-contrast regions. To overcome this problem, the invention provides a crosstalk elimination method incorporating a dynamic color compensation mechanism, which effectively enhances 3D image quality and improves the user's viewing experience.

In one embodiment, an autostereoscopic display apparatus is provided, comprising: an array of display pixels arranged in rows and columns; and an array of elongated optical elements extending parallel to one another and overlying the display pixels. For any given pixel, an optimized display value, referred to as final_c, is determined according to the following equations: when $c<c\_inv$, $final\_c=c+(c-c\_inv)\times cp$: when $c>c\_inv$, $final\_c=c+(c-c\_inv)\times cn$; wherein c represents the original display value of the given pixel; c_inv represents the display value of the corresponding pixel for the other viewpoint: cp is a coefficient greater than 0; and cn is another coefficient greater than 0.

By dynamically adjusting the coefficients cp and cn, the system compensates color values across the left and right viewing channels to reduce crosstalk at horizontally oriented high-contrast boundaries, thereby maintaining stereoscopic image separation and improving visual fidelity. These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

By adjusting the coefficients (cp and cn)—for example, according to different lens designs exhibiting varying degrees of crosstalk—the following effects can be achieved. By tuning the coefficient cp, crosstalk appearing in darker regions (where the color contrast of the opposite viewpoint is lower relative to the original viewpoint) can be effectively reduced. For instance, if a region intended to appear as pure red becomes light red due to leakage of g and b components from the white region of the opposite view, adjusting cp can restore the original saturated red tone, thereby eliminating the unwanted color blending.

By tuning the coefficient cn, crosstalk appearing in brighter or higher-contrast regions can be eliminated. For example, if a region intended to be white becomes slightly tinted with red due to leakage from the opposite viewpoint, adjusting cn can remove the red ghost image and recover the correct white region appearance. Because the proposed equations automatically compute the adjustment coefficients to values approaching zero in regions of low contrast, the method preserves the original color distribution across most of the image while selectively suppressing crosstalk in high-contrast zones.

As a result, the corrected image closely approximates the ideal reference image, providing an effective solution for mitigating the high-contrast ghosting problem in glasses-free 3D displays. Reference will now be made in detail to embodiments, examples of which are illustrated in the accompanying drawings. In the following detailed description, numerous specific details are set forth to provide a thorough understanding of the present invention. However, it will be apparent to one of ordinary skill in the art that the present invention may be practiced without these specific details. In other instances, well-known methods, components, have not been described in detail so as not to unnecessarily obscure aspects of the embodiments.

The present invention relates to an autostereoscopic display apparatus and a method for reducing crosstalk in such a device. More particularly, the invention provides a dynamic color compensation mechanism that adjusts pixel display values based on inter-viewpoint contrast, thereby improving image separation and reducing crosstalk at high-contrast regions in glasses-free three-dimensional (3D) displays.

In conventional autostereoscopic displays utilizing lenticular or liquid crystal (LC) lens structures, high-contrast transitions between left-eye and right-eye image content often result in visible ghosting or double images, commonly referred to as crosstalk. The invention overcomes this issue by introducing a per-pixel correction model using dynamically adjustable coefficients that compensate the color intensity between corresponding pixels of different viewpoints.

Figures 1A, 1B:
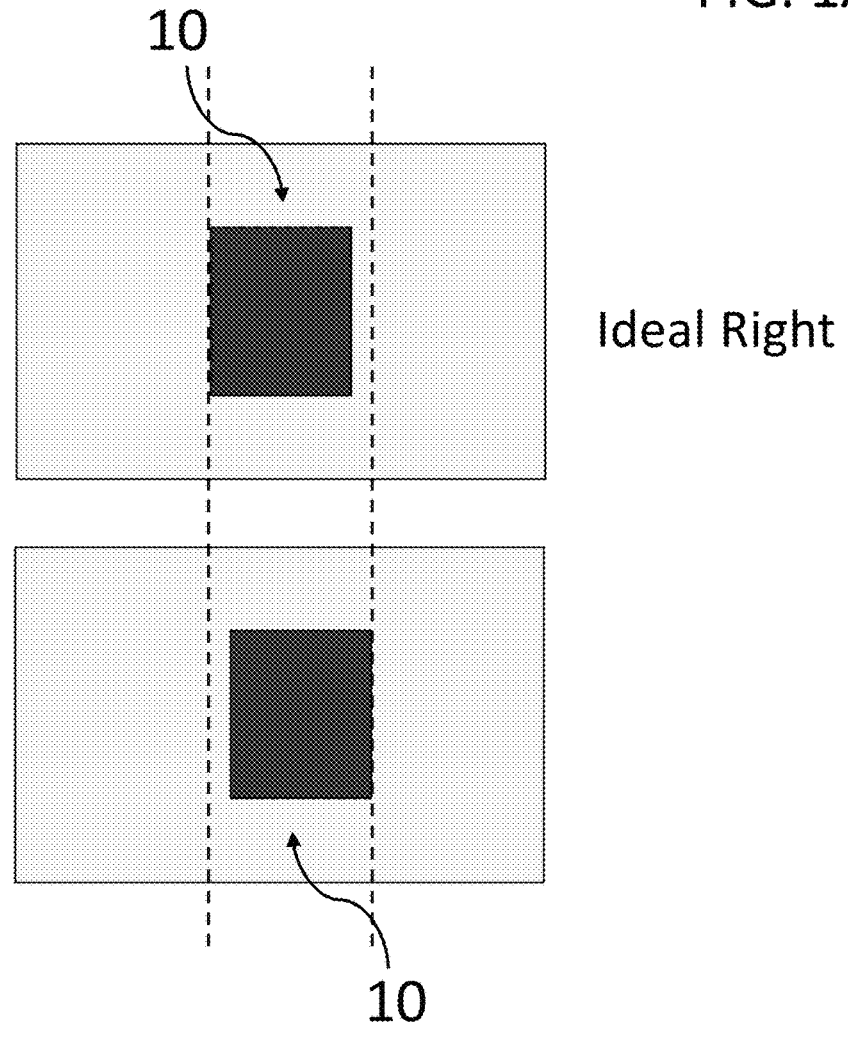
FIGS. 1A-1B illustrate a crosstalk effect perceived by the right eye.
Figure 2A:
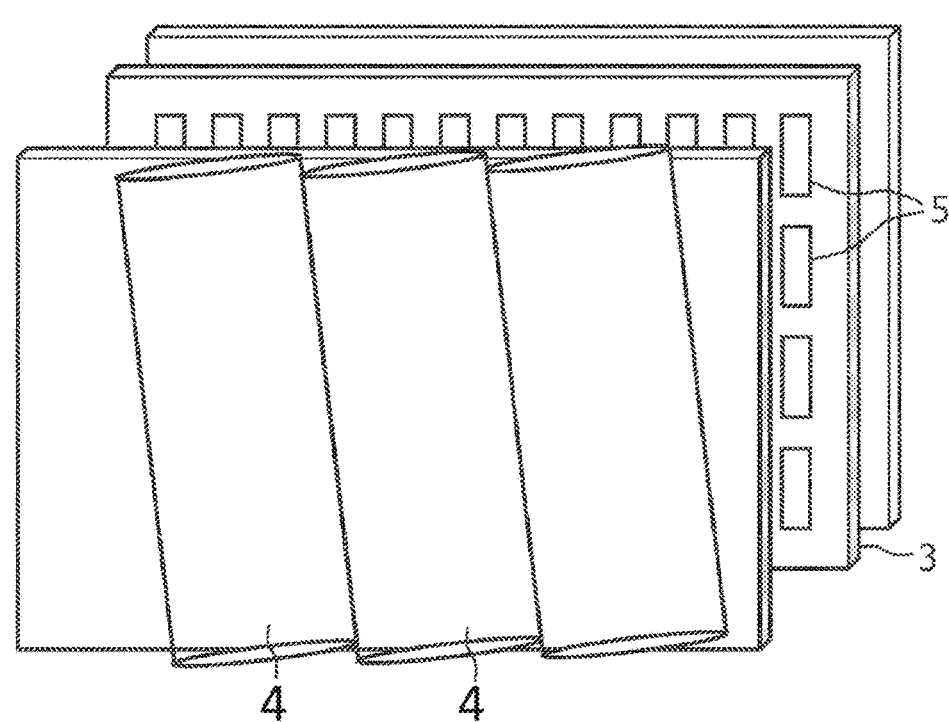
FIGS. 2A-2B provide schematic views of a typical autostereoscopic display.
Figure 2B:
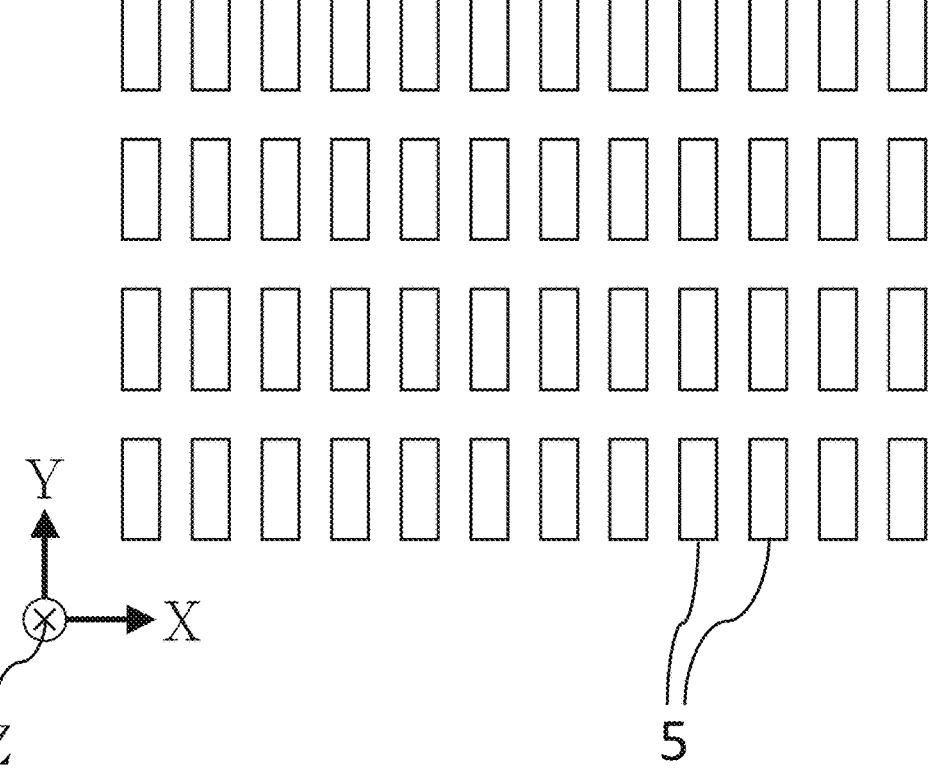
Figures 3A, 3B:
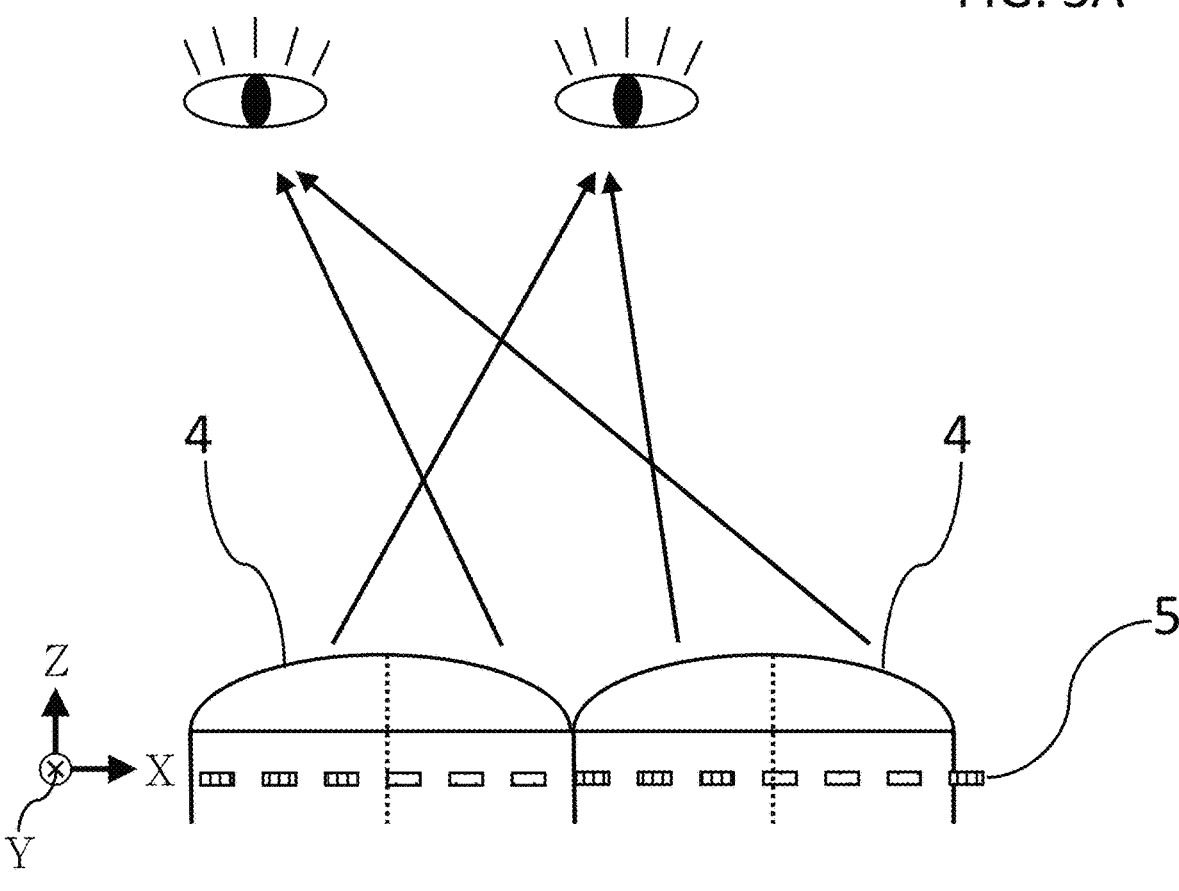
FIGS. 3A-3B illustrates, for any given pixel, there is a corresponding pixel associated with the other viewpoint.

Referring to FIGS. 3A and 3B, the autostereoscopic display apparatus according to one embodiment of the invention comprises: an array of display pixels 5 arranged in rows and columns, and an array of elongated optical elements 4 extending parallel to one another and disposed over the array of display pixels 5. The elongated optical elements 4 may be formed as lenticular lenses, liquid crystal (LC) lenses, or other optical components capable of directing emitted light toward distinct viewing zones corresponding respectively to the left-eye and right-eye viewpoints. Each display pixel 5 of the array can emit light of a defined color and intensity. By selectively controlling these pixel values, stereoscopic image pairs are displayed such that different images are perceived by the viewer's left and right eyes, forming a 3D visual effect without the need for glasses.

For clarity, only a few pixels are illustrated. In practice, the display panel may include thousands of rows and columns of pixels. Each pixel in a digital display is typically composed of smaller units known as sub-pixels. These sub-pixels usually emit red, green, and blue light, corresponding to the three primary colors (RGB) used in standard display systems.

In some advanced or wide color gamut display architectures, a fourth primary color such as white (W) or yellow (Y) may also be employed to enhance brightness or color range. When viewed closely, individual sub-pixels are visible: however, at normal viewing distances, the human visual system perceives the combined light as a single color. By precisely controlling the intensity of each sub-pixel, a wide range of composite colors can be generated.

In practical operation, each pixel includes at least three sub-pixels, each corresponding to one of the primary colors. The optimized display value of each sub-pixel is determined according to the aforementioned equations, wherein c represents the original display value of the sub-pixel of the given pixel, and c_inv represents the display value of the corresponding sub-pixel of the pixel associated with the other viewpoint. This sub-pixel-level computation allows color compensation to be performed independently for each color channel, thereby improving crosstalk suppression precision.

For any given pixel 51 of the display array, the system determines an optimized display value, denoted as final_c, according to the following equations: when $c<c\_inv$, $final\_c=c+(c-c\_inv)\times cp$; when $c>c\_inv$, $final\_c=c+(c-c\_inv)\times cn$. Here c represents the original display value (e.g., color intensity) of the given pixel: c_inv represents the display value of a corresponding pixel 52 associated with the other viewpoint (e.g., the conjugate pixel seen by the opposite eye): cp and en are adjustable compensation coefficients, each greater than 0, which define the magnitude and direction of correction applied to the pixel value.

The coefficients cp and en are variable to minimize the perceived imbalance between left-eye and right-eye image regions. Through such adjustment, the pixel intensity is modified so that the overall difference between viewpoints is optimized, reducing optical leakage and preventing double-image crosstalk at horizontally oriented high-contrast boundaries.

In one embodiment, the coefficients cp and en are adjusted based on a local contrast ratio between the given pixel and its corresponding pixel for the other viewpoint. The contrast ratio may be computed as a color intensity difference. When the local contrast ratio exceeds a defined threshold, the controller increases or decreases the value of cp or en accordingly to strengthen compensation. Conversely, when the contrast ratio is low, the coefficients may be reduced to preserve natural color rendering and avoid overcorrection. This adaptive behavior allows the system to perform fine-grained pixel-level adjustments, effectively suppressing crosstalk in regions where strong contrast edges occur while maintaining accurate color balance in uniform regions.

The apparatus may further comprise a display driving circuit or controller configured to perform the dynamic adjustment of coefficients cp and cn. The circuit can be implemented as part of a display timing controller (TCON), a graphics processing unit (GPU), or a dedicated compensation processor integrated with the display panel. The display driving circuit receives the original image data for both left-eye and right-eye channels and, for each pair of corresponding pixels, calculates the optimized display values final_c using the aforementioned equations.

The corrected pixel data are then output to the display array in real time, ensuring continuous compensation during playback of 3D content. In certain embodiments, the adjustment of cp and cn may be based on a pre-trained mapping table, a neural correction model, or a feedback system using optical sensors to detect crosstalk intensity. The computation may be executed in hardware, firmware, or software without departing from the scope of the invention.

The invention also provides a method for reducing crosstalk in an autostereoscopic display apparatus. The method comprises: for each given pixel 51 in the display array, determining an optimized display value (final_c) using the defined equations based on the original value c and its corresponding viewpoint value c_inv; adjusting the coefficients cp and cn dynamically according to a local contrast ratio or predefined compensation rule; applying the corrected pixel values to the display array via the driving circuit in real time to output the compensated stereoscopic images. By executing these steps, the method enables automatic balancing of chromatic values between left-eye and right-eye views, thereby reducing horizontally oriented crosstalk and enhancing perceived 3D image depth and clarity.

The proposed invention provides the following advantages: significant crosstalk reduction in high-contrast regions of autostereoscopic displays: dynamic per-pixel compensation, maintaining accurate color balance between viewpoints: real-time processing compatible with existing display driving architectures: improved stereoscopic quality and viewing comfort, minimizing ghosting and double-image artifacts.

The invention may be applied to various types of autostereoscopic displays, including liquid crystal displays (LCDs), organic light-emitting diode (OLED) displays, and other multi-view or switchable 2D/3D panels utilizing lenticular or LC lens optics. Through the combination of pixel-wise color compensation, adaptive coefficient control, and real-time correction via a display driving circuit, the present invention effectively mitigates the crosstalk phenomenon inherent in glasses-free 3D displays.

In one embodiment, the elongated optical elements 4 comprise lenticular lenses or liquid crystal (LC) lenses, as described in U.S. application Ser. No. 19/241,571, which was filed on Jun. 18, 2025, which is incorporated herein by reference in its entirety for all purposes, configured to direct light toward different viewing zones corresponding to left-eye and right-eye viewpoints. In another embodiment, the elongated optical elements 4 comprise lenticular lenses or liquid crystal (LC) lenses, as described in U.S. application Ser. No. 19/214,113, which was filed on May 21, 2025, which is incorporated herein by reference in its entirety for all purposes.

With respect to the selection and calculation of the corresponding sub-pixels, each display pixel is mapped according to the geometric position of the lenticular lens. Taking, for example, an LCD display panel used in a two-view autostereoscopic 3D system, the rendered images and the physical pixel array of the panel are assumed to be perfectly aligned in a one-to-one manner, such that each rendered pixel value (R, G, B) corresponds exactly to one display sub-pixel on the screen. For clarity, only a few pixel coordinates are illustrated in FIG. 3B. In practice, the sub-pixel architecture is generally more complex.

Figure 4A:
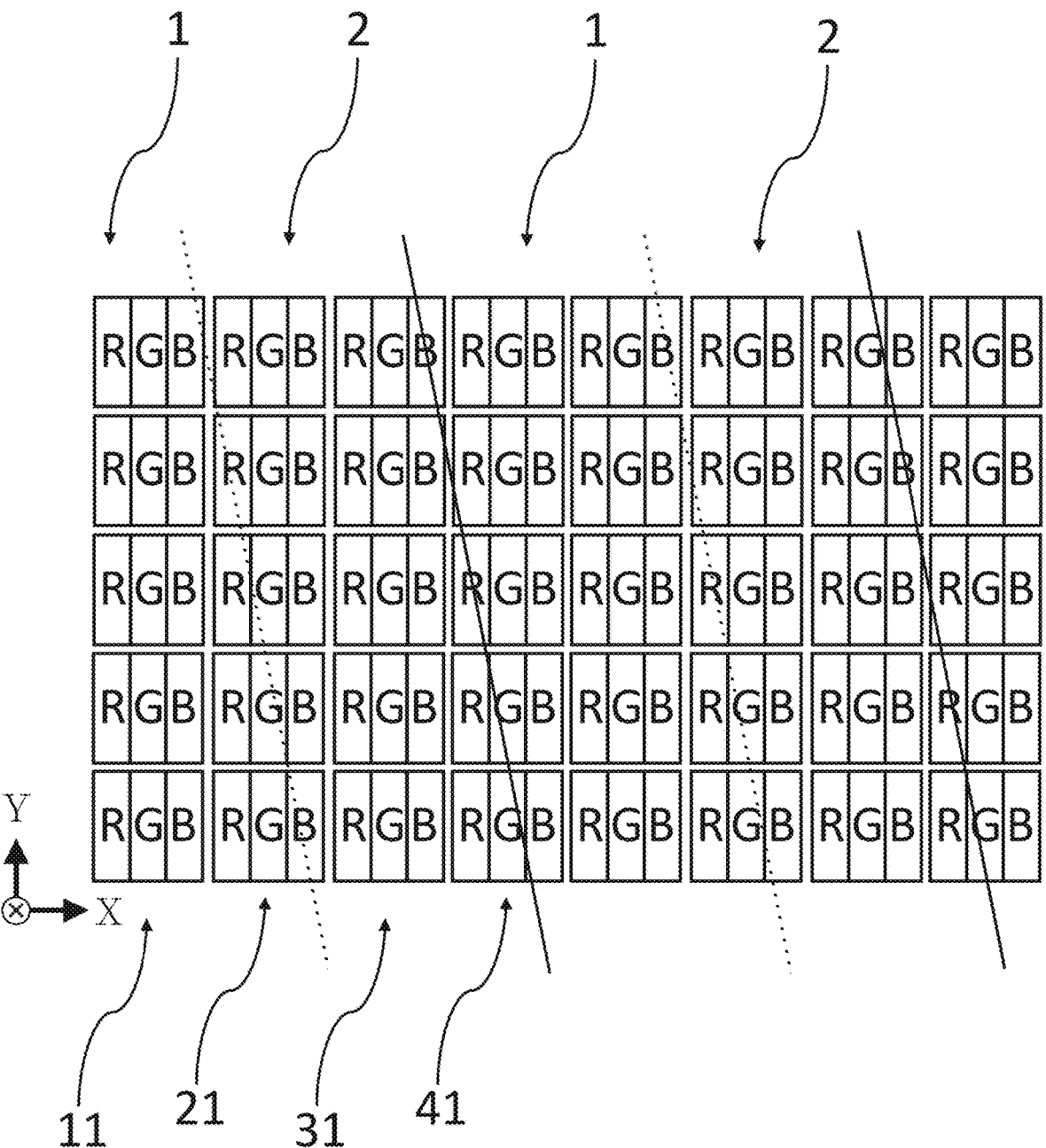
FIGS. 4A-4D illustrates the sub-pixel coordinate structures and rendering differences between LCD-based and OLED-based autostereoscopic displays.
Figure 4B:
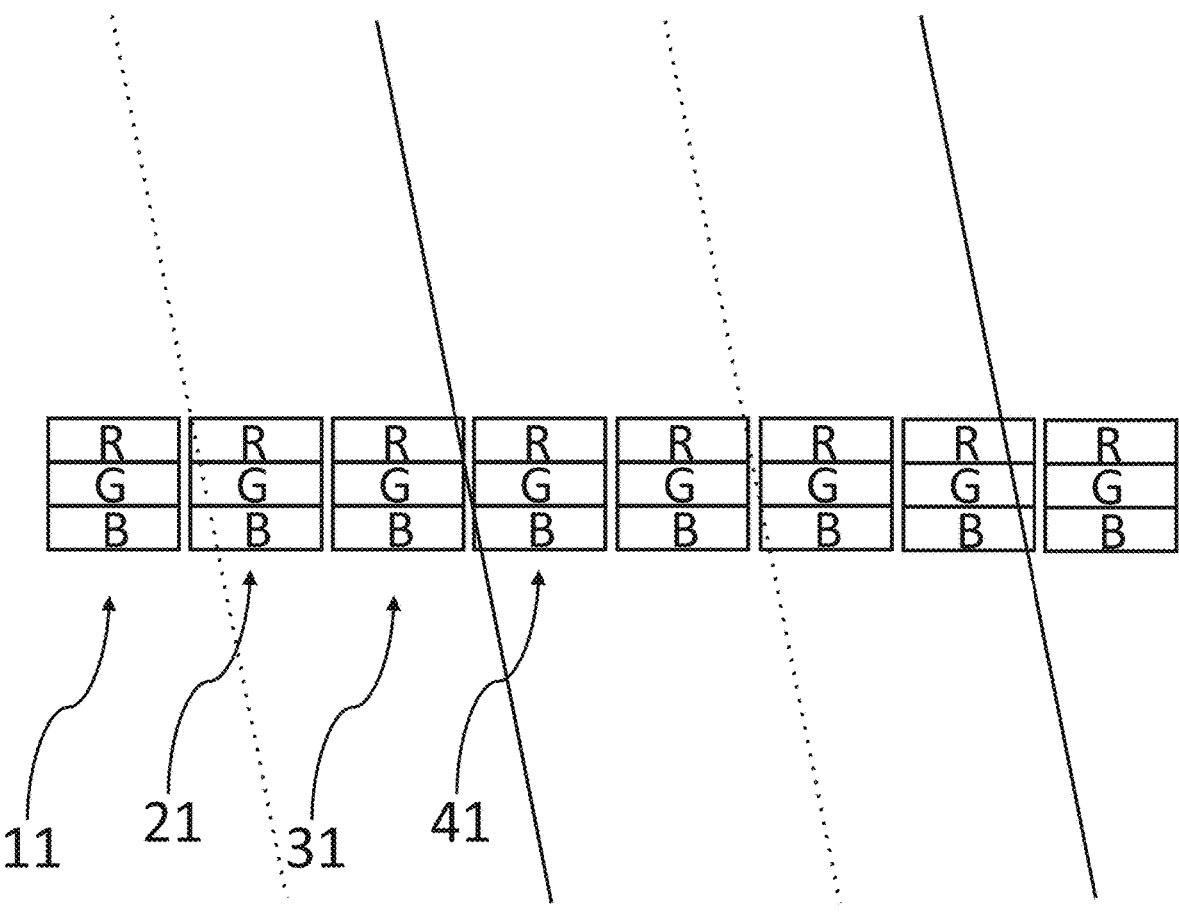

For a standard LCD display, as shown in FIG. 4A, each pixel coordinate includes at least three sub-pixels, each corresponding to one of the primary colors. Assuming pixel positions (X. Y) with a unit pixel pitch (i.e., the next pixel is at (X+1. Y)), the sub-pixel coordinates can be defined as: $R=(X-0.3333, Y)$, $G=(X, Y)$, $B=(X+0.3333, Y)$. For coordinate (1, 1), the sub-pixel coordinates can be defined as: $R=(1-0.3333, 1)$, $G=(1, 1)$, $B=(1+0.3333, 1)$. When the pixel architecture is rotated (horizontal-to-vertical), as shown in FIG. 4B, the same principle applies by adjusting the positional offsets, for example: $R=(1, 1+0.3333)$, $G=(1, 1)$, $B=(1, 1-0.3333)$.

During two-view operation, for any rendered image and any given pixel coordinate, the system determines—based on the planar coordinates (x, y) of the pixel—whether each sub-pixel should display the color data of the image of viewpoint 1 or viewpoint 2. In other words, each sub-pixel on the display is assigned to either viewpoint 1 or viewpoint 2 according to a rendering function defined as: $f(x, y, h, v, o)=\{1, 2\}$, where h, v, and o respectively represent the lens width, lens slant angle, and horizontal offset, describing the optical geometry of the lenticular structure. Suppose the pixel coordinates from (x, y) to (x+3, y) are designated as coordinates 11, 21, 31, and 41. The function $f(x, y, h, v, o)$ defines which sub-pixel at each coordinate should display the color component from viewpoint 1 or viewpoint 2. The rendered image and the display output are therefore ideally matched on a pixel-to-pixel basis, representing an ideal LCD-based autostereoscopic rendering process.

Figure 4C:
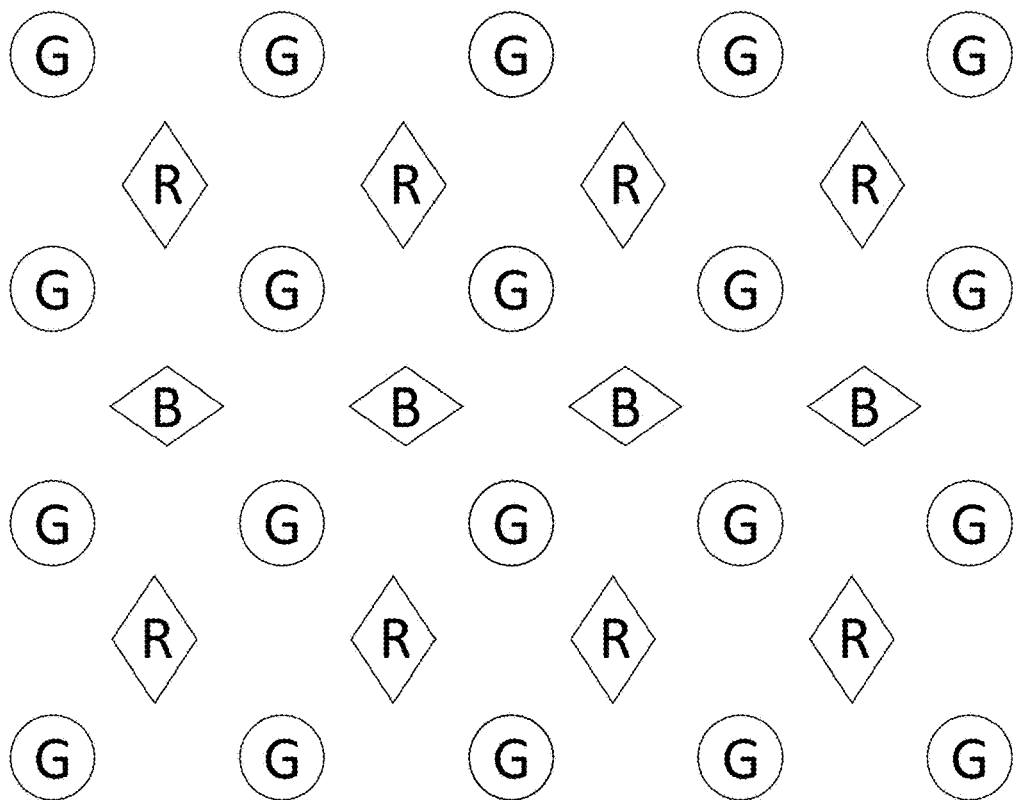

However, in OLED displays, such perfect one-to-one pixel mapping is often not achieved. As shown in FIG. 4C, OLED panels typically employ a sub-pixel sharing architecture, in which one physical sub-pixel may belong to more than one logical pixel, in contrast to the LCD structure where each pixel exclusively consists of three sub-pixels (R, G, B). This mismatch causes the total number and arrangement of sub-pixels in the rendered image to deviate from the physical sub-pixel positions on the OLED panel, such that the (x, y) coordinate mapping in the function $f(x, y, h, v, o)$ cannot be accurately defined. The consequence is that abnormal color edges or chromatic leakage may appear.

Figure 4D:
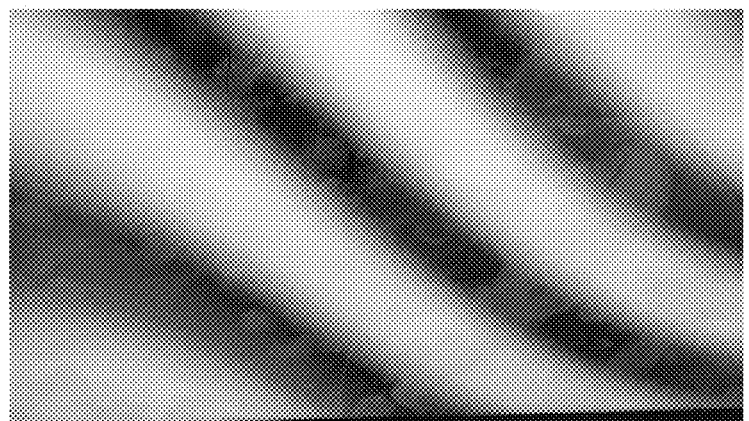

In an ideal two-view black-and-white autostereoscopic rendering, clear alternating black-and-white separation bands are visible when perfect point-to-point mapping is achieved. In contrast, on an OLED-type display, while stereoscopic separation may still occur, color irregularities or chromatic fringes appear along high—contrast boundaries—for example, as shown in FIG. 4D, colored edges may appear in regions that should ideally be purely black and white. To address this issue, a randomized sub-pixel coordinate algorithm based on the geometric arrangement of OLED sub-pixels is introduced.

For OLED panels where the physical sub-pixel positions are irregular or shared, each logical pixel (X. Y) is simulated using a set of coordinate offsets: $(rx_1, ry_1, gx_1, gy_1, bx_1, by_1, rx_2, ry_2, gx_2, gy_2, bx_2, by_2)$. In practice, these parameters are user-adjustable through a software calibration interface. The coordinate offsets $(rx_1, ry_1, gx_1, gy_1, bx_1, by_1)$ correspond to viewpoint 1, and $(rx_2, ry_2, gx_2, gy_2, bx_2, by_2)$ correspond to viewpoint 2. Accordingly, in Step 1: if $(X+Y) \% 2==0$, the sub-pixel coordinates are assigned as: $R=(X+rx_1, Y+ry_1)$, $G=(X+gx_1, Y+gy_1)$, $B=(X+bx_1, Y+by_1)$; if $(X+Y) \% 2==1$, then: $R=(X+rx_2, Y+ry_2)$, $G=(X+gx_2, Y+gy_2)$, $B=(X+bx_2, Y+by_2)$. Based on these coordinate assignments, a first rendered image set is generated that better matches the OLED's physical pixel layout.

In Step 2, from the given parameter set $(rx_1, ry_1, \ldots, bx_2, by_2)$, an inverse parameter group is automatically generated: $(-rx_1, -ry_1, -gx_1, -gy_1, -bx_1, -by_1, -rx_2, -ry_2, -gx_2, -gy_2, -bx_2, -by_2)$. Repeating Step 1 using this inverse parameter set yields a second rendered image set representing an opposite geometric sampling condition. For example, in Step 2: if $(X+Y) \% 2==0$, the sub-pixel coordinates are assigned as: $R=(X-rx_1, Y-ry_1)$, $G=(X-gx_1, Y-gy_1)$, $B=(X-bx_1, Y-by_1)$; if $(X+Y) \% 2==1$, then: $R=(X-rx_2, Y-ry_2)$, $G=(X-gx_2, Y-gy_2)$, $B=(X-bx_2, Y-by_2)$.

Finally, the rendered results from Step 1 and Step 2 may be combined using a randomization algorithm, wherein each sub-pixel position probabilistically selects color data from either the first or the second rendered image set. This mixed rendering significantly reduces color fringing and edge artifacts, resulting in smoother color transitions and improved image consistency in OLED-based autostereoscopic displays.

In one embodiment, a method for generating a rendered image for an autostereoscopic display apparatus, the method comprising: mapping each display pixel of a display panel according to a geometric position of a lenticular lens: for each pixel defined by planar coordinates (x, y), determining, by a rendering function $f(x, y, h, v, o) \{1, 2\}$, whether each sub-pixel corresponds to a left-eye or right-eye image, wherein h, v, and o respectively represent a lens width, slant angle, and horizontal offset; and rendering each sub-pixel with color data corresponding to the selected viewpoint, thereby producing a stereoscopic image.

In one embodiment, the display panel is a liquid-crystal display (LCD) panel having a one-to-one correspondence between rendered image pixels and physical sub-pixels, such that each rendered pixel value (R, G, B) directly corresponds to one display sub-pixel. In another embodiment, the display panel is an organic light-emitting diode (OLED) panel having a sub-pixel sharing structure, and the method further comprises simulating each logical pixel (X. Y) using coordinate offsets $(rx_1, ry_1, gx_1, gy_1, bx_1, by_1, rx_2, ry_2, gx_2, gy_2, bx_2, by_2)$ to compensate for positional mismatch between rendered sub-pixels and physical sub-pixels:

the coordinate offsets are user-adjustable through a software calibration interface, and the offsets ($rx_1$, $ry_1$, $gx_1$, $gy_1$, $bx_1$, $by_1$) correspond to viewpoint 1, while ($rx_2$, $ry_2$, $gx_2$, $gy_2$, $bx_2$, $by_2$) correspond to viewpoint 2: the sub-pixel coordinates are assigned according to the following rules: if $(X+Y)$ % $2==0$, then $R=(X+rx_1, Y+ry_1)$, $G=(X+gx_1, Y+gy_1)$, $B=(X+bx_1, Y+by_1)$; if $(X+Y)$ % $2==1$, then $R=(X+rx_2, Y+ry_2)$, $G=(X+gx_2, Y+gy_2)$, $B=(X+bx_2, Y+by_2)$; thereby generating a first rendered image set corresponding to the OLED's physical sub-pixel layout.

The method may further comprising automatically generating an inverse parameter set ($-rx_1$, $-ry_1$, $-gx_1$, $-gy_1$, $-bx_1$, $-by_1$, $-rx_2$, $-ry_2$, $-gx_2$, $-gy_2$, $-bx_2$, $-by_2$), repeating the coordinate assignment using the inverse set to obtain a second rendered image set representing an opposite geometric sampling condition: or further comprising blending the first rendered image set and the second rendered image set using a randomization algorithm, wherein each sub-pixel position probabilistically selects color data from either the first or the second rendered image set, thereby reducing color fringing and edge artifacts in OLED-based autostereoscopic displays.

In one embodiment, an autostereoscopic display system, comprising: a display panel including an array of pixels and corresponding sub-pixels: a lenticular lens array aligned with the display panel; and a controller configured to execute any of the methods disclosed herein to determine sub-pixel coordinate assignments and perform randomized blending to generate a stereoscopic image with reduced color irregularities. Through the above OLED sub-pixel randomization and coordinate mixing process, the color irregularities and boundary artifacts caused by non-uniform sub-pixel geometry are effectively mitigated. This ensures that even under shared or irregular sub-pixel configurations, the autostereoscopic rendering maintains proper left-right image separation and stable color fidelity.

The invention therefore provides a practical and scalable solution for improving image fidelity and enhancing user experience in autostereoscopic display technologies. All changes and modifications that fall within the metes and bounds of the claims are intended to be embraced by the appended claims.

The invention claimed is:

1. An autostereoscopic display apparatus, comprising:

an array of display pixels arranged in rows and columns; and an array of elongated optical elements extending parallel to one another and overlying the display pixels, wherein for any given pixel, an optimized display value (final_c) is determined based on the following equations:

$$\text{when } c < c\_inv, \text{final}\_c = c += (c - c\_inv) \times cp;$$

$$\text{when } c > c\_inv, \text{final}\_c = c + (c - c\_inv) \times cn,$$

wherein c is an original display value of the given pixel, c_inv is a display value of a corresponding pixel for the other viewpoint, cp is a coefficient greater than 0, and cn is another coefficient greater than 0, wherein the coefficients cp and cn are adjustable to compensate color values.

2. The autostereoscopic display apparatus of claim 1, wherein the coefficients cp and cn are adjusted based on a local contrast ratio between the given pixel and its corresponding pixel for the other viewpoint.

3. The autostereoscopic display apparatus of claim 1, wherein adjustment of the coefficients cp and cn is implemented by a display driving circuit configured to apply a pixel-level correction signal to each pixel.

4. The autostereoscopic display apparatus of claim 1, wherein the elongated optical elements comprise lenticular lenses or liquid crystal (LC) lenses configured to direct light toward different viewing zones corresponding to left-eye and right-eye viewpoints.

5. A method for reducing crosstalk in an autostereoscopic display apparatus comprising an array of display pixels and an array of elongated optical elements, the method comprising:

for each given pixel, determining an optimized display value (final_c) according to the following equations:

$$\text{when } c < c\_inv, \text{final}\_c = c + (c - c\_inv) \times cp; \text{when } c > c\_inv,$$
$$\text{final}\_c = c + (c - c\_inv) \times cn,$$

wherein c is the original display value of the given pixel, c_inv is the display value of a corresponding pixel for the other viewpoint, cp and en are coefficients greater than 0, and the coefficients cp and cn are adjustable to compensate color values.

6. The method of claim 5, wherein the coefficients cp and cn are adjusted based on a local contrast ratio between the given pixel and its corresponding pixel for the other viewpoint.

7. A method of claim 5, wherein adjustment of the coefficients cp and cn is implemented by a display driving circuit configured to apply a pixel-level correction signal to each pixel.

\* \* \* \* \*